Dec. 15, 1959     D. N. HEALD     2,917,171
SIZING MACHINE

Filed Oct. 26, 1956     4 Sheets-Sheet 3

DELBERT N. HEALD
INVENTOR
HUEBNER, BEEHLER,
WORREL & HERZIG
ATTORNEYS
BY Richard M. Worrel Dec. 15, 1959

D. N. HEALD 2,917,171

SIZING MACHINE

Filed Oct. 26, 1956

DELBERT N. HEALD
INVENTOR
HUEBNER, BEEHLER,
WORREL & HERZIG
ATTORNEYS
BY

United States Patent Office 2,917,171
Patented Dec. 15, 1959

2,917,171

SIZING MACHINE

Delbert N. Heald, Fresno, Calif.

Application October 26, 1956, Serial No. 618,628

9 Claims. (Cl. 209—107)

The present invention relates to an improved article sizing machine and more particularly to such a machine for carrots and other articles which it is desired to segregate into predetermined classifications as to size.

Sizing machines have been known to include an inclined vibratory sizing table having at least a pair of spaced rollers providing a slot uniformly progressively increasing in width from the upper end of the table to the lower end thereof. Articles such as carrots are delivered to the table at the narrow end of the slot and the rollers driven so that their adjacent peripheries travel upwardly. The articles are urged to move toward the wide or lower end of the slot while being constantly tumbled by the action of the rollers. When the articles reach positions longitudinally of the slot corresponding to their size, they descend through the slot into chutes or receptacles and are thereby segregated in the manner desired.

Such machines have been subject to several disadvantages overcome by the improvements of the subject invention. Because of the shape of certain articles which it is desired to grade, it is particularly difficult to grade with complete accuracy. Quite frequently, the larger articles interfere with the smaller articles at the narrow end of the slot so that the smaller articles cannot descend through the slot at the proper locations. Also, limber, flexible, or wilted vegetables or the like frequently cause additional difficulties. This is further aggravated when an attempt is made to move large volumes of articles through the machine as is frequently commercially required. In an effort to avoid the problem of interference and to improve the accuracy of grading, it has been necessary in known machines to reduce the machine capacity below that desired.

It is of course preferable to grade articles more thoroughly and to a finer degree into the smallest units of size in any particular quantity of articles. However, efforts to accomplish this in the past have usually involved increasing the length of the sizing table thereby making the slot longer to enable more gradual expansion of thes lot. This has been unsatisfactory because of the additional support required for the table and the rollers.

Vibration of the sizing table has also presented a problem. Breakage as a result of vibration has increased as a result of the increased length of the table for purposes as above described. Structural failures have occurred even though the materials used in the machine have been of heavy duty structural steel.

With the foregoing in mind, it is an object of the present invention to provide improvements in article sizing machines intended to overcome certain disadvantages of the prior art.

Another object is to provide a sizing machine which grades articles according to size with improved accuracy.

Another object is to reduce the interference between articles being graded in a sizing machine.

Another object is to enable a sizing machine to grade articles which are flexible, limber, or wilted without impairing its accuracy.

Another object is to enable a sizing machine effectively to handle a larger capacity of articles to be graded.

Another object is to minimize breakage and failure of parts through vibration of sizing machines.

Another object is to provide a sizing machine having an improved vibratory movement.

Another object is to decrease the length of a sizing table for use in a sizing machine.

Another object is to enable the grading of articles into smaller units of size.

Another object is to provide a sizing machine which is adjustable and which has great flexibility in use and operation.

Other objects are to provide a sizing machine which is durable in construction, dependable in operation, adapted to handle many types of articles in wide volumetric ranges, and which is excellently suited for its intended purposes.

These and other objects will become apparent upon reference to the following description and accompanying drawings.

Figure 1:
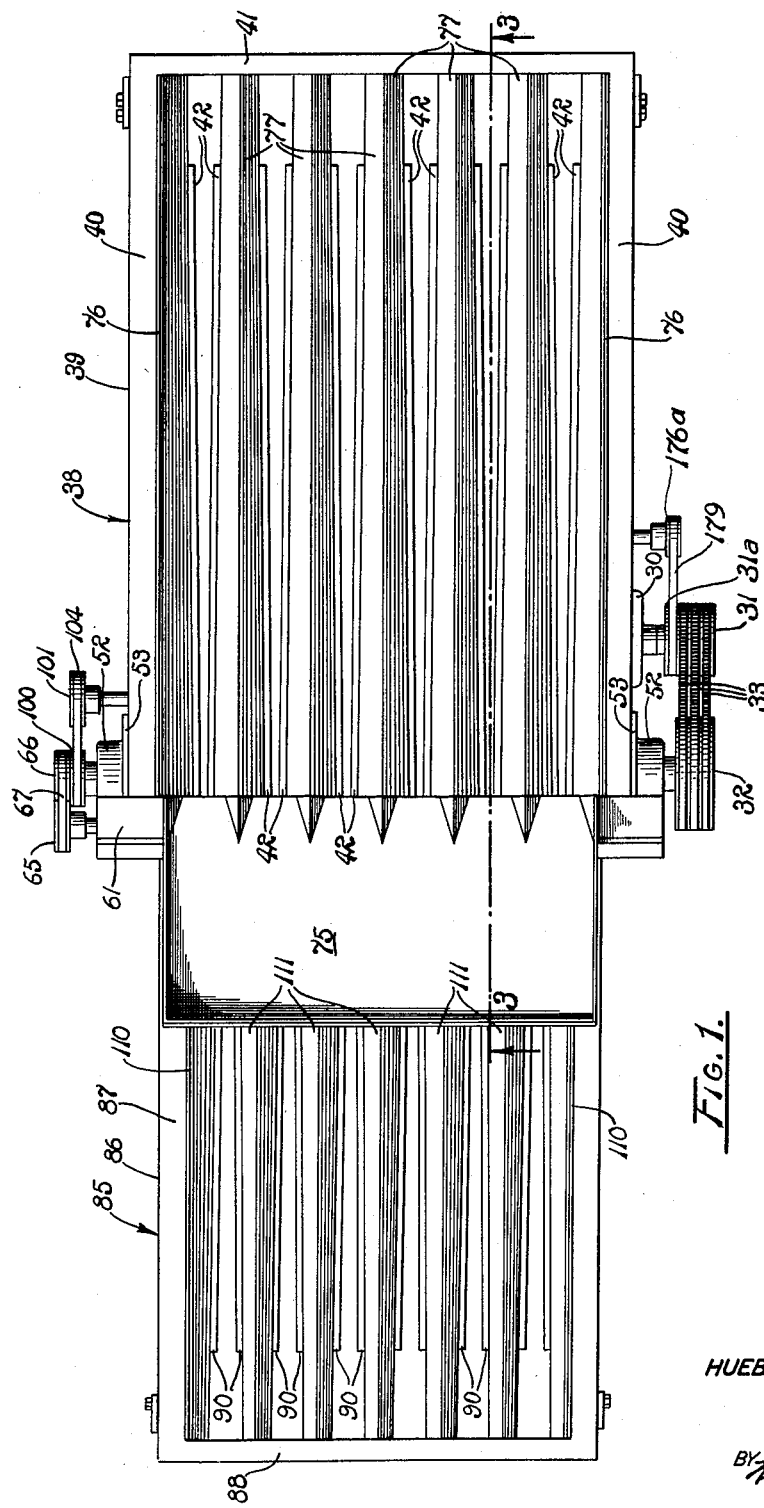
Fig. 1 is a top plan view of an article sizing machine incorporating the principles of the present invention.

Referring in detail to the drawings, a rigid support frame is generally indicated at 10 and includes elongated base elements 11, upright end posts 12 and 13, upright center columns 14, intermediate upright posts 15, elongated horizontal beams 16 extended between the end posts 12 and the columns, inclined braces 17 extended between the intermediate posts and the end posts 12, oppositely inclined struts 18 extended between the end posts 13 and the center columns 14, and transverse base elements, not shown, interconnecting the longitudinal base elements. A substantially horizontal platform 22 is secured to the longitudinal beams between the intermediate posts and the columns.

Figure 2:
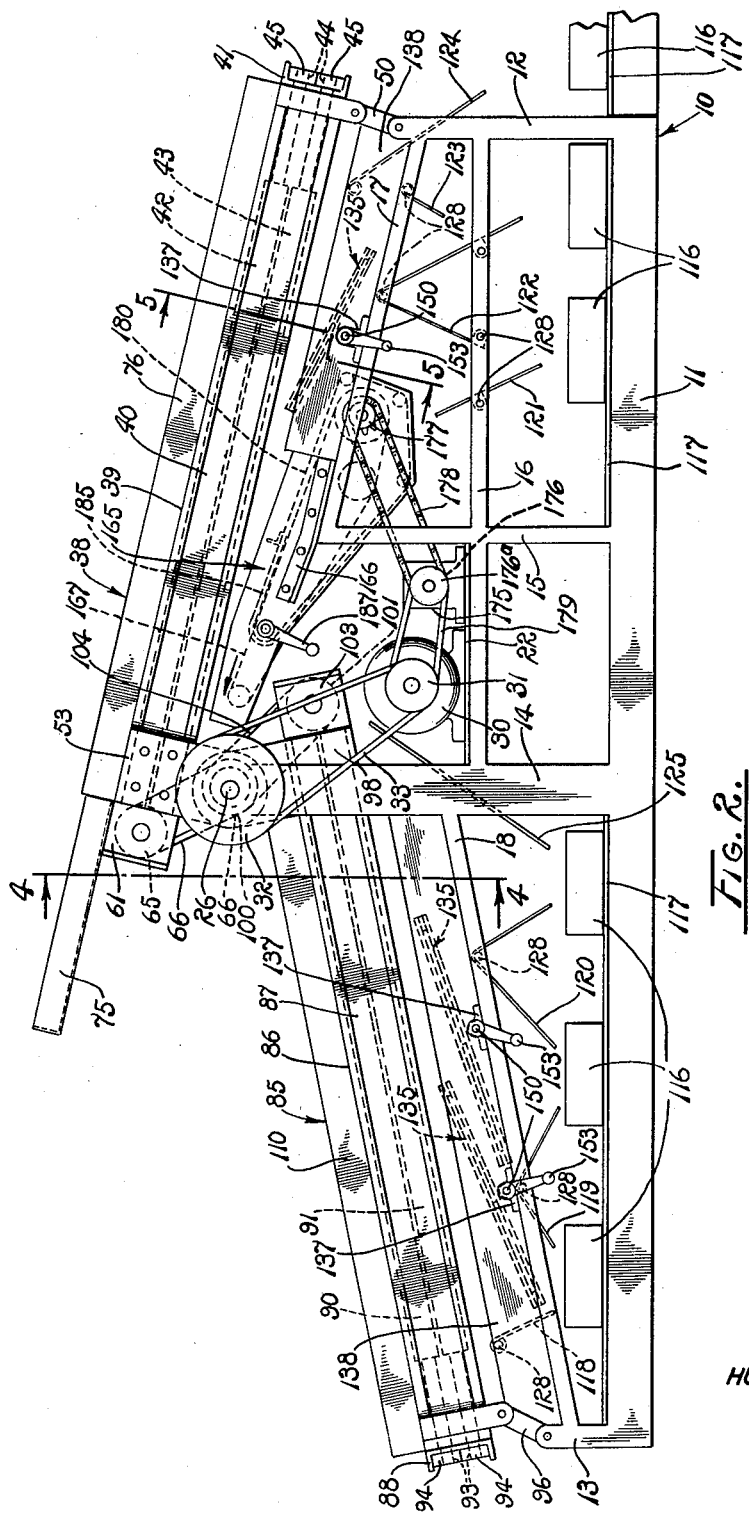
Fig. 2 is a side elevation of the sizing machine illustrated in Fig. 1.
Figure 4:
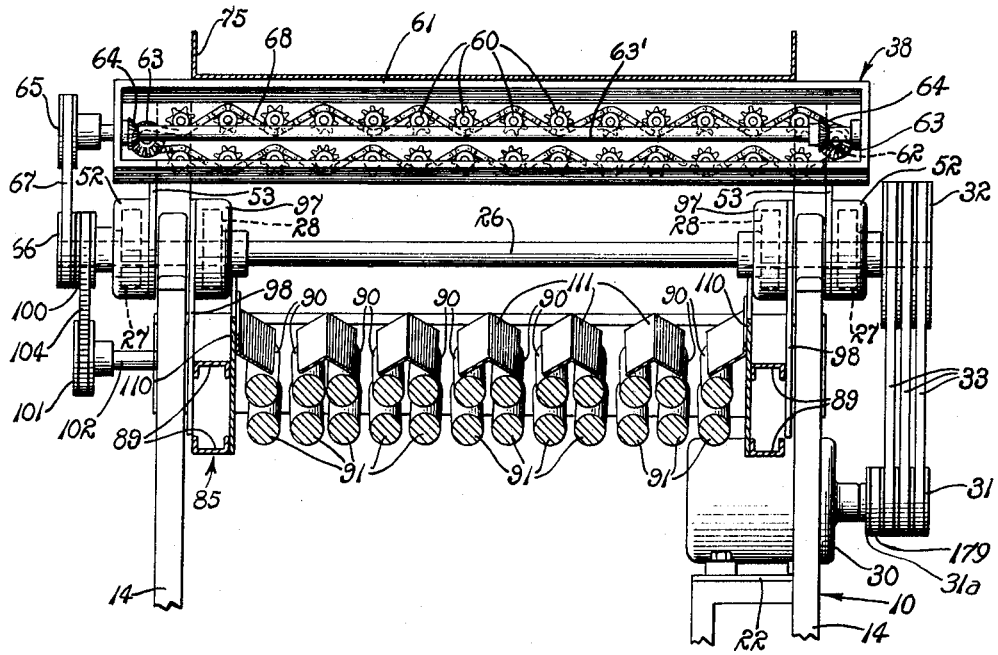
Fig. 4 is a somewhat enlarged fragmentary vertical section taken on line 4—4 of Fig. 2.

An elongated horizontal cam shaft 26 is mounted in bearings in the upper ends of the columns 14 and has ends extended outwardly of the columns, all as best seen in Fig. 4. A pair of outer, upper-table cams 27 are eccentrically secured to the cam shaft for rotation therewith outwardly of the columns. It is to be noted that the outer cams have maximum radii extended radially of the cam shaft in precisely the same direction. A pair of inner, lower-table cams 28 are rigidly secured to the cam shaft between the columns. The inner cams are in 180° phase displacement relative to the outer cams and thus have maximum radii radially extended from the cam shaft in diametrically opposite directions from the maximum radii of the outer cams. A table drive motor 30 is mounted on the platform 22 and has a drive pulley 31 connected thereto, as best seen in Figs. 2 and 4. The motor rotates the cam shaft by means of a driven pulley 32 connected to one end of the cam shaft and a plurality of belts 33 extended around the drive and driven pulleys.

An upper sizing table is generally indicated by the numeral 38 and includes a substantially rectangular table frame 39 having longitudinal frame members 40 interconnected by transverse end frame members 41. A plurality of upper frusto-conical sizing rollers 42 are rotatably mounted longitudinally in the table frame in substantially axially parallel relation. A plurality of lower frusto-conical rollers 43 are also rotatably mounted longitudinally in the frame in corresponding positions below the upper rollers. The rollers provide lower ends mounted in bearings 44 secured to the frame by bearing brackets 45. It is to be noted that the lower ends of the rollers are diametrically reduced in size from the major portion of the lengths of the rollers.

The upper and lower rollers 42 and 43 are arranged in pairs so as to define slots or sizing passages therebetween of substantially uniformly progressively increasing width from the upper end to the lower end of the table frame 39. The maximum and minimum widths of the slots of the lower rollers are slightly greater than the maximum and minimum widths of the slots of the upper rollers, respectively. As an example, in a commercial embodiment of the subject invention, the maximum and minimum widths of the slots between upper pairs of rollers is two and one-eighth inches and one inch, respectively. In this same embodiment the maximum and minimum widths of the slots between the lower pairs of rollers are one and seven-eighths inches and three-fourths of an inch, respectively. Thus the lower rollers are one-fourth of an inch closer together than the upper rollers in this particular machine in which the rollers are approximately three inches in diameter and their centers vertically spaced approximately four inches.

Lower pendent links 50 are pivotally connected to the lower end of the upper table frame 39 at upper ends of the links and provide lower ends pivotally connected to the upright end posts 12. With particular reference to Figs. 2 and 4, substantially circular outer housings 52 receive the outer cams 27 for slidable rotation therewithin incident to rotation of the cam shaft 26. Support plates 53 rigidly individually interconnect the outer housings and the upper end of the upper table frame. In this manner the upper sizing table is mounted for horizontal or longitudinal reciprocal vibratory movement in the support frame 10 when the cam shaft is rotated.

Cog wheels 60 are provided on the rollers 42 and 43 of the upper sizing table 38. A mounting bracket 61 is secured to the upper end of the upper sizing table, and guide wheels 62 are mounted therein laterally outwardly of the rollers for rotation on axes substantially parallel to the rollers. Driven bevel gears 63 are also rigidly mounted on the guide wheels. Drive bevel gears 64 are rigidly mounted on the shaft 63' which is journaled in the mounting bracket 61 and the drive gears are in mesh with the driven bevel gears. A circular driven pulley 65 is secured to the shaft 63' for the driven bevel gears; a circular drive pulley 66 is eccentrically mounted on the cam shaft 26 precisely concentric to the cams 27; and a belt 67 is extended around the drive and driven pulleys for turning the drive bevel gears in response to rotation of the cam shaft. Thus, drive is transmitted to the rollers 42 and 43 by means of the driven bevel gears 63, and an endless chain 68 which is extended around the driven bevel gears and the guide wheel and is in mesh with the cog wheels. It is to be noted that adjacent peripheries of each pair of rollers are traveled upwardly by the described drive mechanism.

A feed chute 75 is secured to the upper end of the sizing table 38; side guards 76 are extended longitudinally along opposite sides of the table and upwardly therefrom; and a plurality of inverted V-shaped shields 77 are mounted longitudinally in the table frame 39 above adjacent rollers of adjacent pairs of rollers so as to direct articles to be graded into the slots between the rollers.

A lower sizing table is generally indicated by the numeral 85 and includes a substantially rectangular table frame 86 having spaced parallel longitudinal frame members 87 and transverse end frame members 88. Facing channels 89 are longitudinally extended along the longitudinal frame members on the outside surfaces thereof. A plurality of upper and lower rollers 90 and 91 of frusto-conical shape are mounted longitudinally in the lower table frame in substantially axially parallel relation. As with the upper sizing table 38, these rollers are arranged in pairs to define slots or sizing passages therebetween of substantially uniformly progressively increasing width from the upper to the lower ends of the rollers. In the embodiment referred to above, the maximum and minimum widths of the slots of the upper rollers in the lower table are one and seven-eighths inches and three-fourths of an inch, respectively, and the maximum and minimum widths of the slots between the lower pairs of rollers are one and one-fourth inches and one-half of an inch, respectively. Thus, the maximum and minimum widths of the lower slots are less than the corresponding dimensions of the upper slots. It is to be observed that the maximum and minimum widths of the lower slots of the lower sizing table are less than these dimensions in the slots of the upper sizing table 38.

The rollers 90 and 91 provide lower ends journaled in bearings 93 secured to the lower frame 86 by a bearing bracket 94. The rollers in the lower table also have diametrically reduced lower end portions. Lower pendent links 96 provide upper ends pivotally connected to the lower end of the sizing table 85 and the lower ends pivotally connected to the end posts 13. With reference to Fig. 4, inner housings 97 receive the inner cams 28 for rotatable slidable movement therewithin. Support plates 98 individually rigidly interconnect the housings and the upper end of the lower sizing table 85. It will be readily apparent that the lower table is vibrated in the same manner as the upper table 38 although 180° out of phase therewith as a result of the 180° phase displacement of the cams 27 and 28.

The rollers 90 and 91 in the lower sizing table 85 are driven in the same manner as the rollers 42 and 43 in the upper sizing table 38 although not shown in detail. Suffice it to note that a drive pulley 100 is eccentrically mounted on the cam shaft 26 precisely concentric to the cams 28, and a driven pulley 101 is concentrically connected to a bevel gear shaft 102 journaled in a mounting bracket 103 secured to the upper end of the lower sizing table 85. The pulleys are interconnected by a pulley belt 104. The shaft 102 is connected to drive bevel gears, as 105, which, in turn, mesh with driven bevel gears, as 106, to move a chain 107 in mesh with cog wheels 108 on the upper ends of the rollers 90 and 91.

Figure 3:
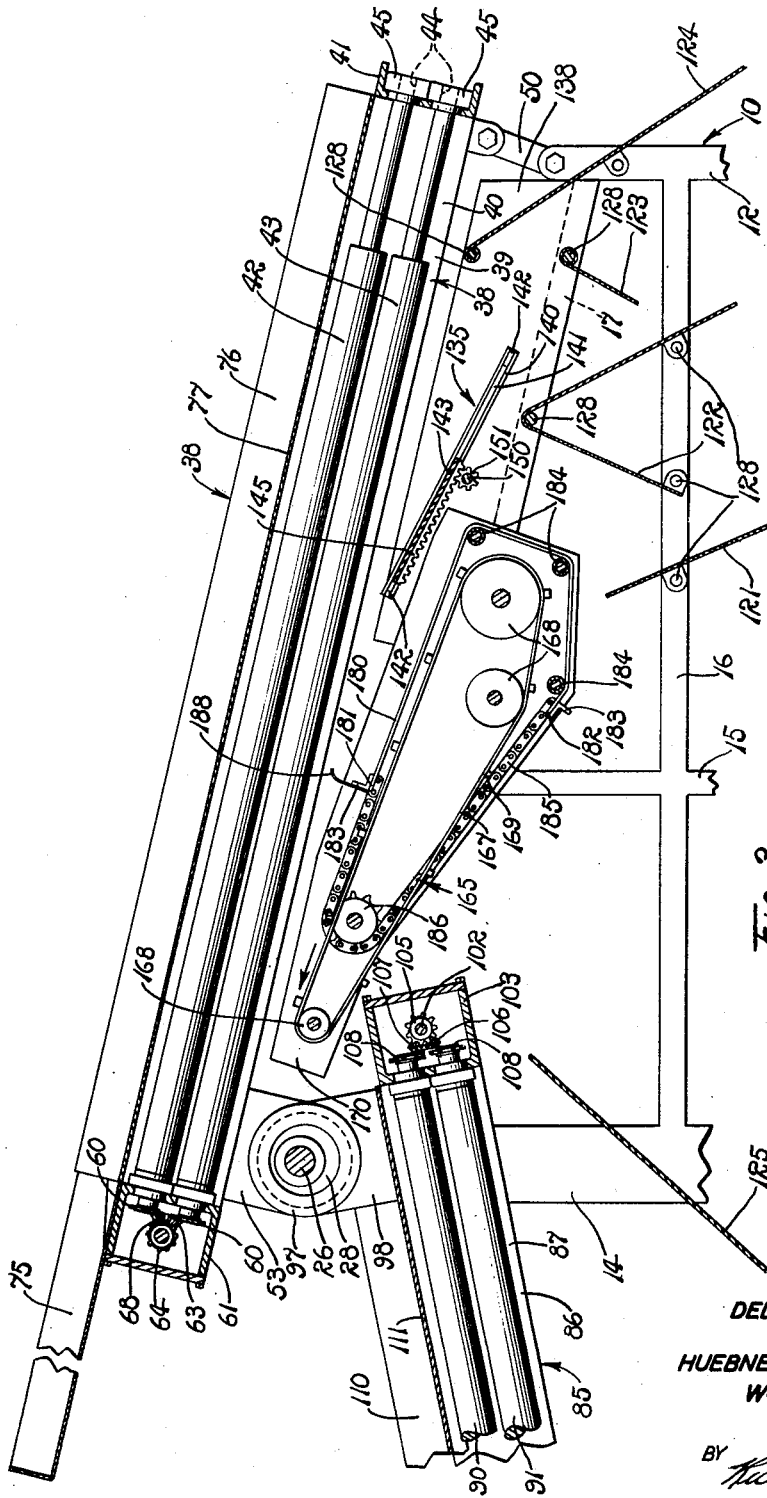
Fig. 3 is a somewhat enlarged fragmentary vertical section taken on line 3—3 of Fig. 1.

It is to be noted by particular reference to Figs. 1 and 3 that the sizing tables 38 and 85 are mounted in the support frame 10 in oppositely longitudinally inclined positions and in a substantially common vertical plane. Further, the upper end of the lower table is below the upper end of the upper table.

Side guards 110 are secured to the lower sizing table 85 along the longitudinal frame members 87, and inverted V-shaped shields are longitudinally extended in the table over adjacent rollers 90 of adjacent pairs of rollers, as best seen in Fig. 4.

A plurality of boxes or other receivers 116 are mounted on platforms 117 on the base elements 11 of the support frame 10. The boxes are spaced longitudinally of and below the sizing tables 38 and 85. A plurality of article deflectors 118, 119, 120, 121, 122, 123, 124 and 125 are mounted in the support frame 10 between the sizing tables and the boxes so as to define chutes or passages for directing the articles falling through the slots of the tables into appropriate boxes. Some of the deflectors are mounted on pivot pins 128 so that they may be pivoted to vary the sizes of the chutes or to change the directions in which it is desired to guide the sized articles.

Figure 5:
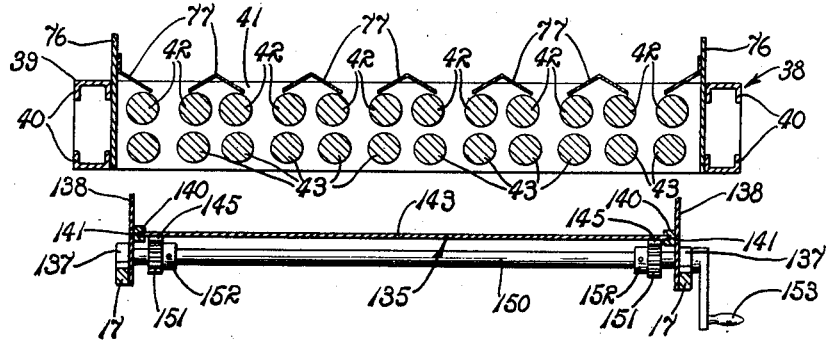
Fig. 5 is a somewhat enlarged vertical section taken on line 5—5 of Fig. 2.

The sized articles are further guided and directed into the boxes 116 or chutes by means of gates, generally indicated by the numeral 135. Three such gates are shown in the illustrated embodiment. Since they are all of identical construction, only one will be considered in detail. For this purpose specific reference is made to Figs. 3 and 5. Journal bearings 137 are mounted on the braces 17 and the struts 18, as the case may be, and longitudinal side members 138 are upwardly divergently extended along the braces and the struts. Elongated blocks 140 are secured longitudinally along the longitudinal members and provide opposed parallel grooves 141 having stops 142 at opposite ends thereof. A panel 143 approximately half of the length of the casing provides opposite side edges slidably received in the grooves. Longitudinally extended rack gears 145 are secured along the side edges of the panel in spaced parallel relation.

An elongated shaft 150 is rotatably journaled in the bearings 137 and extended through the longitudinal members 138 transversely thereof beneath the panel 143. Spur gears 151 are secured to the shaft and are in mesh individually with the rack gears 145. Collars 152 are pinned to the shaft to prevent axial movement of the spur gears. A crank 153 is connected to the shaft for enabling rotation thereof so that by turning the crank, the panel is slid longitudinally of the side members.

The gates 135 are positioned between the sizing tables 38 and 85 and the chutes as defined by the deflectors 118 to 125, both inclusive. The panels 143 are longitudinally adjusted over selected chutes so that articles descending from the tables may enter or may be blocked from certain of the chutes. It is also to be noted that longitudinal side members 138 prevent articles from falling outwardly of the frame in their descent toward the boxes 116.

A transfer conveyer 165 is mounted in the frame 10 on longitudinal brackets 166 between the upper and lower sizing tables 38 and 85. The conveyer, as best seen in Fig. 3, includes an endless belt 167 traveled in a circuitous path on guide wheels 168 rotatably mounted in the support frame. A plurality of transverse ribs 169 are secured on the belt in longitudinally spaced positions to assist motivation of articles therealong. The belt of the transfer conveyer provides an upper run positioned below the upper and central areas of the upper sizing table and in somewhat greater inclination than the upper table. Further, the transfer conveyer has a discharge end 170 positioned above the upper end of the lower sizing table so as to deposit articles conveyed thereon onto the lower sizing table.

A conveyer drive transmission 175 is mounted on the platform 22 and has a drive sprocket 176 secured thereto. A driven sprocket 177 is mounted on one of the conveyer guide wheels 168, and a chain 178 is extended around the sprockets 176 and 177. A pulley belt 179 extends around a drive pulley 31a connected to the motor 30 and a driven pulley 176a of the transmission to enable motivation of the conveyer upon energization of the motor. It will be evident that the upper run of the belt 167 travels upwardly, as indicated by the arrow in Fig. 3.

The conveyer 165 thus receives articles descending through the slots in the upper sizing table 38. In order to enable adjustable selection of these articles, a substantially rectangular cover 180 of flexible sheet material, such as canvas, is provided in partially adjustably overlying relation to the conveyer belt 167. Specifically, the cover has a top front edge 181, a bottom rear edge 182 and angle irons 183 transversely secured along said edges. The cover is extended around a plurality of guide rolls 184 rotatably mounted in the support frame radially outwardly of the lower guide wheels 168 for the transfer conveyer. Chains 185 provide opposite ends secured to the angle irons in transversely spaced relation and are extended around sprockets 186 rotatably mounted in the support frame in longitudinally spaced relation to the upper guide wheel. A crank 187 is connected to the sprockets for enabling rotation thereof so as to move the cover longitudinally of the upper run of the belt 167 between a position substantially midway between the upper and the lower ends of the upper run so as to cover substantially the lower half of the upper run and a position adjacent the lower end of the upper run so as to expose substantially all of the upper run. It will be evident that in this manner articles from various longitudinal locations along the upper table may be selected for delivery on the transfer conveyer to the lower sizing table 85. The articles falling on the cover merely slide downwardly into one of the chutes. In order to prevent overflow of articles from the effective length of the upper run of the belt 167 onto the cover, an overflow plate 188 is secured to the upper angle iron transversely of the belt and upwardly extended therefrom.

Operation

The operation of the described embodiment of the subject invention is believed to be readily apparent and is briefly summarized at this point. Initially, the machine is adjusted in accordance with the expected size of articles to be graded and the desirability of obtaining certain specified sizes in particular boxes 116. For this purpose, the deflectors 118 to 125, inclusive, the gates 135, and the cover 18 are adjusted in a manner believed evident.

The motor 30 for driving the tables 38 and 85 and the conveyer 165 is energized. Articles such as carrots, parsnips, asparagus, oranges, or other articles requiring sizing are delivered to the feeding chute 75 where they are directed onto the upper end of the upper sizing table. The articles are guided onto the pairs of rollers 42 by the shields 77. The articles descend the table while being tumbled by the upwardly traveled adjacent peripheries of the rollers. When the articles reach a position longitudinally of the table where their size corresponds to the width of a slot, they fall through the slot. The vibratory movement of the upper table together with the inclination of the table cooperate in urging the articles toward the lower end of the table.

The smaller articles of predetermined sizes pass through the upper ends of the slots in the upper table 38 for grading on the lower rollers 43. Some article sizes may even be smaller than the width at the upper ends of the slots. Thus, certain of the smaller articles are removed from the upper rollers to be graded subsequently and so as not to interfere with grading of the larger articles. Articles of gradually increased size drop through the slots as the articles descend further downwardly along the rollers. Only the largest fail to fall through the slots and these are directed downwardly at the lower ends of the rollers against the deflector 124 and into an awaiting box 116. On the lower rollers, therefore, the larger sizes have been removed and there is greater concentration in sizing articles of relatively smaller size.

Considering the action on the lower rollers 43, the larger articles thereon drop between the slots at the lower ends of the rollers and depending on the position of the panel 143 of the gate 135, drop between deflectors 121 and 122 or between deflectors 122 and 123 into boxes 116 therebelow. Certain of the smaller articles on the lower rollers drop through the upper ends of the slots onto the conveyor 165. The location of the cover 180 determines what articles will be further sorted in the lower sizing table 85 and what articles will be directed between the deflectors 121 and 122, as will be evident. The conveyer delivers articles falling thereon over the discharge end 170 thereof onto the upper end of the lower sizing table 85.

The articles are guided onto the upper rollers 90 by the shields 111. As before, the articles are tumbled downwardly along the slots. When they reach positions corresponding to the size of the articles, they descend onto the lower rollers 91. It will be evident that as the articles pass from one set of rollers to the next, they are more precisely graded into smaller units of size. This is true inasmuch as articles of a predetermined size are removed or prevented from falling through the slots on each set of rollers.

The articles descending along the lower rollers 91 of the lower sizing table 85 fall downwardly and depending on the position of the panels 143 of the gates 135 fall between the deflectors 118, 119, 120 and 125 into the boxes 116.

The tables 38 and 85 are alternately and successively urged toward each other and away from each other by the action of the cam shaft 26, cams 27 and 28, and housings 52 and 97. As explained, the vibratory movement tends to urge the articles downwardly along the rollers. However, the movements of the tables counterbalance each other throughout the entire 360° rotation of the cam shaft. It will be evident that the forces imposed on the cam shaft by the tables are always equal and opposite. It has been found that this minimizes breakage and failure of parts and still permits vigorous vibration of the sizing tables for urging the articles downwardly along the tables. The pulleys 66 and 100 are eccentrically mounted in such a manner as to accommodate movement of their respective tables toward and away from the shaft 26 notwithstanding the pulley belt connections.

Another significant advantage of the subject invention is the shortness of the sizing tables 38 and 85. By using a series of sizing stages as defined by the tables, each table can be made shorter in length. Thus, support is only needed at the ends of the tables and not in the center. Of course, the use of dual tables offers the additional advantage of inertia counter-balancing as above explained. Still further, grading in successive stages enables more accurate segregation of the articles into smaller units of size since in each stage, articles of predetermined size, are removed so that the successive stage is able to concentrate on grading a relatively smaller size without interference of the larger sizes previously removed.

From the foregoing, therefore, it will be evident that a sizing machine has been provided which is more accurate, has greater capacity, is less subject to breakage and failure, and has improved vibratory movement than previously known sizing machines. Although the described apparatus of the subject invention is capable of sizing many types of articles, it has been found to be most effective in grading most difficult irregularly shaped articles such as carrots.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a machine for grading articles of various sizes in successive stages wherein the articles are successively graded into smaller units of size, a support frame; upper and lower elongated oppositely longitudinally inclined sizing tables mounted in the frame in vertically spaced relation having upper ends adapted to receive articles to be sized, lower ends toward which said articles tend to descend, and elongated longitudinally extended slots of substantially uniformly progressively increasing width from the upper ends to the lower ends of their respective tables whereby the articles gravitationally descend through the slots when reaching a position at which the slots are wide enough to accommodate their passage, the slot in the lower table having maximum and minimum widths less than the maximum and minimum widths, respectively, of the slot in the upper table; a transfer conveyer mounted in the frame downwardly inclined in substantially the same direction as the upper table positioned below the upper end of the upper table and above the upper end of the lower table so as to receive articles passing downwardly through the slot in the upper table, the conveyer having a discharge end for delivering articles received to the upper end of the lower table; a cover having a front edge; and means mounting the cover in the frame in overlying spaced relation to the conveyer and for adjustable movement longitudinally of the conveyer toward and away from said discharge end whereby the effective length of the conveyer from the front edge of the cover to said discharge end can be adjusted to receive articles descending from the upper table along selected lengths of the slot in the upper table.

2. In a machine for grading articles of various sizes in successive stages wherein the articles are successively graded into smaller units of size, a support frame; upper and lower elongated oppositely longitudinally inclined sizing tables mounted in the frame in vertically spaced relation having upper ends adapted to receive articles to be sized, lower ends toward which said articles tend to descend, and elongated longitudinally extended slots of substantially uniformly progressively increasing width from the upper ends to the lower ends of their respective tables whereby the articles gravitationally descend through the slots when reaching a position at which the slots are wide enough to accommodate their passage, the slot in the lower table having maximum and minimum widths less than the maximum and minimum widths, respectively, of the slot in the upper table; a transfer conveyer mounted in the frame downwardly inclined in substantially the same direction as the upper table positioned below the upper end of the upper table and above the upper end of the lower table so as to receive articles passing downwardly through the slot in the upper table, the conveyer having a discharge end for delivering articles received to the upper end of the lower table; a cover having a front edge; means mounting the cover in the frame in overlying spaced relation to the conveyer and for adjustable movement longitudinally of the conveyer toward and away from said discharge end whereby the effective length of the conveyer from the front edge of the cover to said discharge end can be adjusted to receive articles descending from the upper table along selected lengths of the slot in the upper table; and a plate secured to the front edge of the cover extended transversely of the conveyer for preventing overflow of articles from said effective conveyer length onto the cover.

3. In a sizing machine including a support frame; an elongated longitudinally inclined sizing table mounted in the frame having an upper receiving end adapted to receive articles to be sized, a lower extended end toward which such articles tend to move, and an elongated longitudinally extended slot of substantially uniformly progressively increasing width from the receiving to the extended end of the table whereby articles gravitationally descend through the slot when reaching a position at which the width of the slot corresponds to the size of the articles; and a plurality of chutes mounted in the frame below the table in longitudinally spaced relation to each other relative to the table: a gate for directing articles descending through the slot into a selected chute comprising spaced parallel elongated side members extended longitudinally of the table and mounted in the frame between the table and the chutes, a panel mounted in the side members for longitudinal slidable movement relative to the table, and means for sliding the panel longitudinally of the table to permit or to block passage of articles downwardly from the table into selected chutes.

4. In a sizing machine including a support frame; an elongated sizing table mounted in longitudinally inclined position in the frame having an upper end adapted to receive articles to be sized and a lower end toward which such articles tend to descend, and an elongated longitudinally extended slot of substantially uniformly progressively increasing width from the upper end to the lower end of the table whereby articles gravitationally descend through the slot upon reaching a position where their size is substantially the same as the width of the slot; and a plurality of longitudinally spaced chutes below the table for receiving articles falling therethrough: a gate for directing articles from the table into a selected chute comprising spaced parallel side members extended longitudinally of the table and mounted in the frame between the table and the chutes having substantially parallel grooves extended longitudinally relative to the table, a panel longitudinally slidably mounted in the grooves, a rack gear secured to the panel longitudinally of the table, a pinion gear rotatably mounted in the support frame in mesh with the rack gear, and means for rotating the pinion gear to slide the panel longitudinally of the casing so as to block or to permit descent of articles from the table downwardly into selected chutes.

5. In a sizing machine having a frame, a pair of elongated grading tables having adjacent vertically overlapped inner ends and extended outer ends, means mounting the outer ends of the tables for longitudinal reciprocal movement in the frame, and rotatable grading rollers journaled longitudinally in each of the tables; means mounting the inner ends of the tables for diametrically opposite gyratory movement in the frame about a common axis, for motivating said ends of the tables in the gyratory movement and for rotating the rollers in the tables comprising a shaft journaled substantially horizontally in the frame between the overlapped inner ends of the tables and concentrically of said axis, means for rotating the shaft, substantially circular eccentrics individual to the tables mounted diametrically oppositely on the shaft for rotation with the shaft, means rotatably receiving the eccentrics individually supporting the inner ends of their respective tables on said eccentrics, drive linkages individual to the tables having driving connection to the grading rollers of their respective tables and including driven pulleys located adjacent to their tables' respective eccentrics, substantially circular driving pulleys mounted eccentrically on the shaft and precisely concentrically of the eccentrics for unitary rotation with the eccentrics, and belts individually circumscribing the driving pulleys and the driven pulleys of said eccentrics' respective tables.

6. In a machine for grading articles of various sizes in successive stages wherein the articles are successively graded into smaller units of size, a support frame; upper and lower elongated longitudinally inclined sizing tables mounted in the frame in elevationally spaced relation having upper ends adapted to receive articles to be sized, lower ends toward which said articles tend to descend, and sizing passages substantially uniformly progressively increasing in dimensions from the upper ends to the lower ends of their respective tables whereby the articles gravitationally descend through the passages when reaching a position at which the passages are large enough to accommodate their passage, the passages in the lower table having maximum and minimum dimensions less than the maximum and minimum dimensions, respectively, of the passages in the upper table; and transfer means mounted in the frame in vertically spaced relation between the tables and being adjustable longitudinally of the upper table for receiving articles from selected positions along the upper table and for delivering the articles received to the upper end of the lower table.

7. In a machine for grading articles of various sizes in successive stages wherein the articles are successively graded into smaller units of size, a support frame; upper and lower elongated sizing tables mounted in the frame in vertically spaced relation having ends adapted to receive articles to be sized, opposite ends toward which articles tend to travel from the receiving end, and elongated longitudinally extended slots of substantially uniformly progressively increasing width from the receiving ends to said opposite ends of their respective tables whereby the articles gravitationally descend through the slots when reaching a position at which the slots are wide enough to accommodate their passage, the slot in the lower table having maximum and minimum widths less than the maximum and minimum widths, respectively, of the slot in the upper table; drive means mounted in the frame individually connected to the tables for imparting substantially horizontal reciprocal movement thereto thereby to urge articles from said receiving ends to said opposite ends of the respective tables; and transfer means mounted in the frame between the tables and being adjustable longitudinally of the upper table for receiving articles descending through the slot of the upper table at selected positions along the upper table and for delivering the articles received to the receiving end of the lower table.

8. In a grading machine, a support frame; upper and lower elongated sizing tables mounted in the frame in vertically spaced relation adapted to receive articles to be sized and having sizing passages therethrough; drive means mounted in the frame connected to the sizing tables for imparting vibratory movement thereto whereby articles are distributed over the tables for movement through the passages; a transfer conveyer mounted in the frame between the upper and lower tabels so as to receive articles passing downwardly through the passages in the upper table, the conveyer having a discharge end for delivering articles received by it to the lower table; a cover having a front edge; and means mounting the cover in the frame in overlying spaced relation to the conveyer for adjustable movement longitudinally of the conveyor toward and away from said discharge end whereby the effective length of the conveyer from the front edge of the cover to said discharge end can be adjusted to receive articles descending from the upper table along selected lengths of the upper table.

9. In a sizing machine having a frame, a pair of elongated grading tables having adjacent vertically overlapped inner ends and extended outer ends, means mounting the outer ends of the tables for longitudinal reciprocal movement in the frame, and rotatable grading rollers journaled longitudinally in each of the tables; means mounting the inner ends of the tables for gyratory movement in the frame about a common axis, for motivating said ends of the tables in the gyratory movement, and for rotating the rollers in the tables comprising a shaft journaled substantially horizontally in the frame between the overlapped inner ends of the tables and concentrically of said axis, means for rotating the shaft, substantially circular eccentrics individual to the tables mounted on the shaft for rotation with the shaft, means rotatably receiving the eccentrics individually supporting the inner ends of their respective tables on said eccentrics, drive linkages individual to the tables having driving connection to the grading rollers of their respective tables and including driven members located adjacent to their tables' respective eccentrics, substantially circular driving members mounted eccentrically on the shaft and concentrically of the eccentrics for unitary rotation with the eccentrics, and endless connecting members individually circumscribing the driving pulleys and the driven member of said eccentrics' respective tables.

References Cited in the file of this patent

UNITED STATES PATENTS

| | | |
|---|---|---|
| 546,891 | King | Sept. 24, 1895 |
| 1,317,181 | Sohn | Sept. 30, 1919 |
| 1,651,620 | Norman | Dec. 6, 1927 |
| 1,927,405 | Johnson | Sept. 19, 1933 |
| 2,019,661 | Dietrich | Nov. 5, 1935 |
| 2,020,013 | Bailey | Nov. 5, 1935 |
| 2,297,486 | Linke et al. | Sept. 29, 1942 |
| 2,702,628 | Lucuis et al. | Feb. 22, 1955 |
| 2,728,455 | Greiner | Dec. 27, 1955 |
| 2,786,574 | Clark | Mar. 26, 1957 |
| 2,788,897 | Snyder | Apr. 16, 1957 |

FOREIGN PATENTS

| | | |
|---|---|---|
| 734,891 | Great Britain | Aug. 10, 1955 |